United States Patent [19]

Sasaki

[11] 4,437,348

[45] Mar. 20, 1984

[54] ULTRASONIC IMAGING APPARATUS

[75] Inventor: Hiroshi Sasaki, Ootawara, Japan

[73] Assignee: Tokyo Shibaura Denki Kabushiki Kaisha, Kawasaki, Japan

[21] Appl. No.: 386,081

[22] Filed: Jun. 7, 1982

[30] Foreign Application Priority Data

Jun. 8, 1981 [JP] Japan .................. 56-86902

[51] Int. Cl.³ ........................... G01N 29/00
[52] U.S. Cl. ..................... 73/625; 73/626; 128/660
[58] Field of Search ............ 73/625, 626, 628, 641, 73/620, 629; 367/100, 103, 105, 122, 123, 124, 125, 901, 7, 43; 128/660

[56] References Cited

U.S. PATENT DOCUMENTS

| 3,701,154 | 10/1972 | McKinney | 367/100 |
| 4,016,750 | 4/1977 | Green | 73/629 |
| 4,372,323 | 2/1983 | Takemura et al. | 73/625 |
| 4,392,379 | 7/1983 | Yamaguchi | 73/626 |
| 4,403,314 | 9/1983 | Tournois | 367/100 |

*Primary Examiner*—Stephen A. Kreitman
*Attorney, Agent, or Firm*—Cushman, Darby & Cushman

[57] ABSTRACT

The echo signals from ultrasonic transducer elements are filtered by a plurality of prestage band pass filters having different central frequencies and frequency pass bands. The filtered echo signals from those band pass filters are composed by an adder into a composite echo signal. This composite echo signal from the adder is filtered by a variable band pass filter whose central frequency is shifted and whose frequency band is fixed, whereby the echo signal components passed through the prestage band pass filters are extracted sequentially. The echo signal components from the variable band pass filter are converted by a signal processing circuit into a tomographic signal, which is displayed as a tomographic image by a display.

13 Claims, 14 Drawing Figures

ULTRASONIC IMAGING APPARATUS

BACKGROUND OF THE INVENTION

This invention relates to an ultrasonic imaging apparatus designed to emit ultrasonic beams onto an object and convert the echo waves from the object into echo signals and process those echo signals and then display a tomographic image of the object onto a display unit.

In an ultrasonic imaging apparatus such as, for example, an ultrasonic diagnosis apparatus, the resolution of a tomographic image obtained therefrom, especially the resolution of a tomographic image with regard to the depth direction of an object, is determined depending upon the diameter of the ultrasonic beam irradiated onto the object. The diameter of the ultrasonic beam depends upon the caliber or diameter of an ultrasonic transducer and the focal distance of the ultrasonic beam. The diameter of the ultrasonic transducer can be varied by varying the number of drived ones of electric-to-acoustic conversion elements constituting the ultrasonic transducer. Further, the focal distance of the ultrasonic beam can be varied by varying the length of delay time respectively given to drive signals driving the electric-to-acoustic conversion elements. Accordingly, in order to obtain high resolution with regard, widely, to the depth direction of the object, it is sufficient to vary the beam diameter of the ultrasonic transducer and the focal distance of the ultrasonic beam in accordance with the distance from the ultrasonic transducer to the object, i.e., an object portion inside a living body.

Conventionally, where it is desired to vary the diameter of the ultrasonic transducer, this variation in transducer diameter was made by varying, by electric switching elements, the number of electric-to-acoustic conversion elements to be energized. Further, where it is desired to vary the focal distance of the ultrasonic beam, this variation was made by changing over the delay elements connected to the electric-to-acoustic conversion elements by means of electric switching elements. In this method of varying the diameter of the ultrasonic transducer and the focal distance of the ultrasonic beam by using electric switching elements, however, the circuit construction of the ultrasonic imaging apparatus becomes complicated and yet the noises produced at the switching time are mixed into a tomographic image, failing to obtain a precise tomographic image. Furthermore, such noises often cause the electric circuits of the ultrasonic imaging apparatus and the ultrasonic transducer to make erroneous operations.

SUMMARY OF THE INVENTION

Accordingly, the object of the invention is to provide an ultrasonic imaging apparatus which can substantially vary the ultrasonic beam diameter and the focal distance of the ultrasonic beam without using any electric switching element.

According to the invention, to the electric-to-acoustic transducer elements constituting an ultrasonic transducer are respectively connected band pass filters. The band pass filters have different central frequencies and different frequency bands and pass therethrough their corresponding central frequency and band signal components of the echo signals from the transducer elements. The signal components passed through the band pass filters are added to obtain a composite echo signal and supplied to a variable band pass filter. The variable band pass filter shifts the central frequency keeping the band-width to be fixed and passes therethrough only desired signal components of the composite echo signal. That is, the variable band pass filter selectively passes therethrough the echo signal components passed through the fixed band pass filters, thus to substantially vary the ultrasonic beam diameter.

DETAILED DESCRIPTION OF THE PREFERRED EMBODIMENTS

Figure 1:
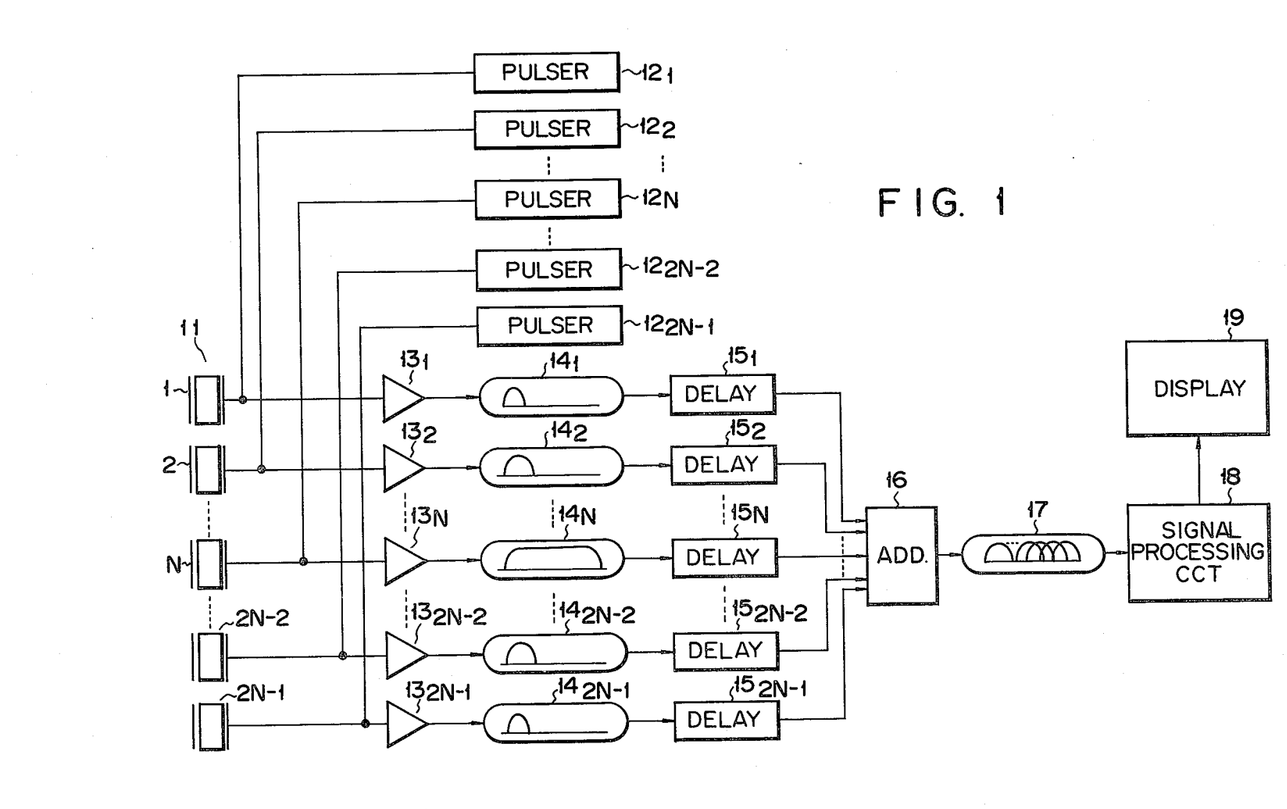
FIG. 1 is a schematic block circuit diagram of an ultrasonic imaging apparatus according to an embodiment of the invention.
Figure 2:
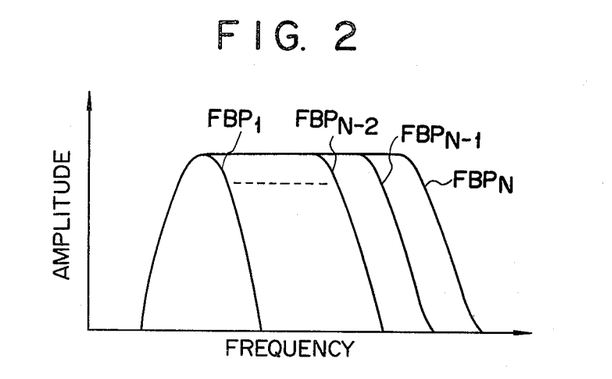
FIG. 2 is a characteristic curve diagram of the fixed band pass filters shown in FIG. 1.

According to an embodiment shown in FIG. 1, electric-to-acoustic elements, i.e., ultrasonic transducer elements (e.g. piezoelectric elements) $1, 2, \ldots, N, \ldots, 2N-2, 2N-1$ constituting an ultrasonic transducer 11 are respectively connected to the output terminals of pulsers $12_1, 12_2, \ldots, 12_N, \ldots, 12_{2N-2}, 12_{2N-1}$ and are also respectively connected to the input terminals of amlifiers $13_1, 13_2, \ldots, 13_N, \ldots, 13_{2N-2}, 13_{2N-1}$, the output terminals of which are respectively connected to the input terminals of fixed band pass filters $14_1, 14_2, \ldots, 14_N, 14_{2N-2}, 14_{2N-1}$. The fixed band pass filters $14_1$ to $14_{N-1}$ and $14_{N+1}$ to $14_{2N-1}$ which are arranged on both sides of a central fixed band pass filter 14N corresponding to the central ultrasonic transducer element N, are respectively set, as they go away from the central filter 14N, to have sequentially lower central frequencies and sequentially narrower band widths. That is, when it is now assumed that the central fixed band pass filter 14N be so set as to have a curve $BP_N$ of FIG. 2, the side fixed band pass filters $14_1$ to $14_{N-1}$ and $14_{N+1}$ to $14_{2N-1}$ are so set as to have curves $BP_{N-1}$ to $BP_1$, respectively.

Figure 3:
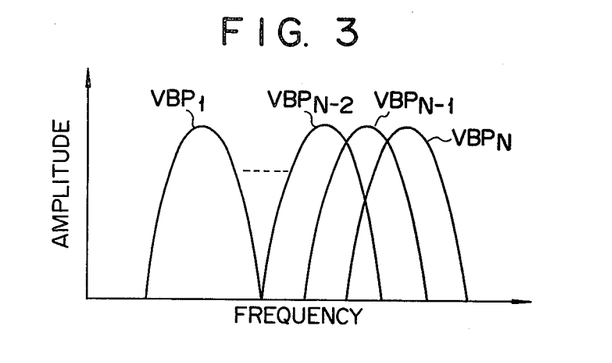
FIG. 3 is a characteristic curve diagram of the variable band pass filter shown in FIG. 1.

Output terminals of the fixed band pass filters $14_1$, $14_2$, ..., $14_N$, ..., $14_{2N-2}$, $14_{2N-1}$ are connected to the input terminal of an adder 16 through delay elements $15_1$, $15_2$, ..., $15_N$, ..., $15_{2N-2}$, $15_{2N-1}$, respectively. The delay elements $15_1$ to $15_{2N-1}$ are so constructed as to have delay times corresponding to the transmission delay times set to converge or focus and sector-scan the ultrasonic beams. The output terminal of the adder 16 is connected to the input terminal of a variable band pass filter 17. This variable band pass filter is so constructed as to enable a shifting of the central frequency with a predetermined band width, as shown in FIG. 3. For example, the filter 17 has a filtering characteristic which is indicated by curves $VBP_N$, $VBP_{N-1}$, $VBP_{N-2}$, ..., $VBP_1$. A detailed circuit construction of the variable band pass filter 17 will be described later. The output terminal of the variable band pass filter 17 is connected to the input terminal of a signal processing circuit 18 for processing echo signals in accordance with an ordinary method. The output terminal of this signal processing circuit 18 is connected to the input terminal of a display 19.

Figure 4:
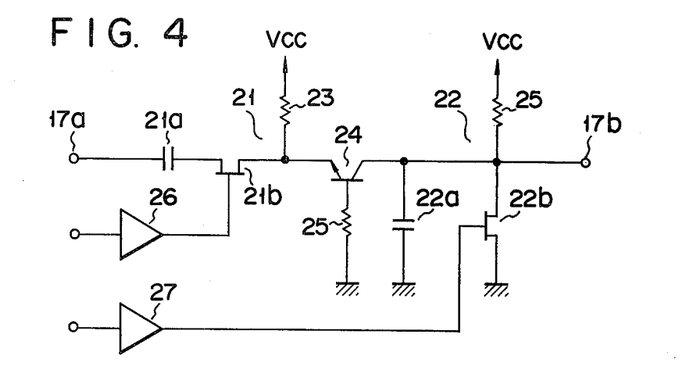
FIG. 4 is a circuit diagram showing the variable band pass filter shown in FIG. 1.
Figure 5:
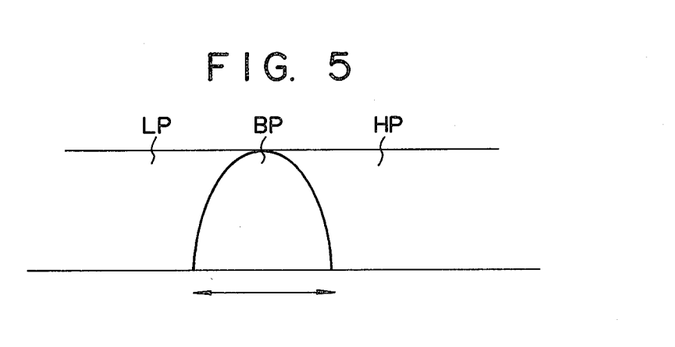
FIG. 5 is a filtering characteristic diagram for explaining the operation of the variable band pass filter of FIG. 4.

The variable band pass filter 17 is comprised of a high pass filter 21 and a low pass filter 22, as shown in FIG. 4. The high pass filter 21 is comprised of serially connected capacitor 21a and impedance element, e.g., FET 21b. The output terminal of FET 21b is connected to a power source $V_{cc}$ through a resistor 23 and also to the emitter of a transistor 24, the base of which is grounded through a resistor 25. The collector of the transistor 24 is grounded passing in parallel through a capacitor 22a and FET 22b of the low pass filter 22, and is also connected to an output terminal 17b. The collector of the transistor 24 is connected to a power source $V_{cc}$ through a resistor 25. Control signal input terminals 28 and 29 are connected to the gates of FETs 21b and 22b through amplifiers 26 and 27, respectively. When predetermined variable signals, for example, saw tooth signals are supplied to the control signal input terminals 28 and 29, the impedances of the FETs 21b and 22b vary, so that the filtering characteristics of the high pass filter 21 and low pass filter 22 vary. As a result, as shown in FIG. 5, a band pass region BP, i.e. an overlap region of a high pass region HP and a low pass region LP, is shifted. Thus, a signal corresponding to the band pass region BP is obtained from the output terminal 17b.

Figure 6:
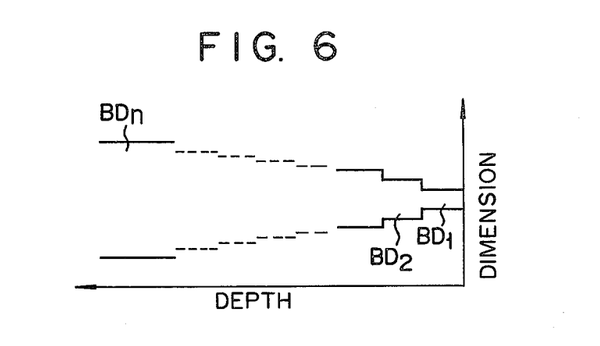
FIG. 6 is a view showing a variable-diameter ultrasonic beam of the ultrasonic imaging apparatus shown in FIG. 1.

Next, the operation of the ultrasonic imaging apparatus according to the invention will be explained in accordance with the above-mentioned circuit construction. When the drive pulses from the pulsers $12_1$ to $12_{2N-1}$ are supplied to the ultrasonic transducer elements 1 to $2N-1$ substantially at the same time, ultrasonic beams are emitted from the ultrasonic transducer elements 1 to $2N-1$ to an object, e.g. a living body (not shown). The echo waves reflected from the living body are converted into echo signals by the ultrasonic transducer elements 1 to $2N-1$. These echo signals are amplified by the amplifiers $13_1$ to $13_{2N-1}$ and then are supplied to the fixed band pass filters $14_1$ to $14_{2N-1}$, respectively. The echo signal has a limited band-width of spectrum components. The echo signals are respectively supplied to the delay elements $15_1$ to $15_{2N-1}$ in regard to their components corresponding to the frequency bands set to the band pass filters $14_1$ to $14_{2N-1}$. That is to say, the central band pass filter $14_N$ supplies the echo signal to the delay element $15_N$ in regard to its entire band-width components, while the band pass filters $14_1$ and $14_{2N-1}$ corresponding to the transducer elements 1 and $2N-1$ at both furthermost ends from the central band pass filter $14_N$ supply the echo signals to the delay elements $15_1$ and $15_{2N-1}$ in regard to their narrowest band-width components, respectively. The delay elements $15_1$ and $15_{2N-1}$ delay the echo signal components supplied thereto in response to the drive pulses and supply their output echo signal components to the adder 16. The adder 16 adds up those echo signal components to provide a composite echo signal, which is supplied to the variable band pass filter 17. Since as mentioned above the variable band pass filter 17 shifts the central frequency with a predetermined band width as shown in FIG. 3, from the filter 17 there are outputted the echo signals which are displaced by degrees in respect of their central frequencies. That is to say, when the filter 17 has a band pass characteristic $VBP_N$ of FIG. 3, the echo signal high-band components passed through the central fixed band pass filter $14_N$ and the filters $14_{N-1}$ and $14_{N+1}$ positioned next thereto pass through the filter 17. This echo signal high band component is regarded as being substantially an echo signal from the central ultrasonic transducer element N, and corresponds to an echo signal when the ultrasonic transducer 11 is of a minimum beam diameter, namely corresponds to an echo signal obtained by the emission of an ultrasonic minimum-diameter beam BM1 of FIG. 6. Where the ultrasonic beam is emitted into the living body, the smaller the beam diameter is, the more the resolution of the resulting tomographic image increases. However, an ultrasonic small-diameter beam fails to deeply enter the living body maintaining its diameter to be constant. Such beam is diffused in the non-deep interior zone of the living body, so that the resolution of a tomographic image from the deep interior zone of the living body decreases very much. In contrast, an ultrasonic large-diameter beam deeply enters the living body keeping its diameter to be constant, and as a result enables a tomographic image to be detected from the deep interior zone of the living body. Thus, varying the beam diameter in accordance with the depth of an object portion in the living body the tomographic image having a considerably high resolution is obtained with regard also to a deep interior zone of the living body. Conventionally, the change-over of the beam diameter was carried out by the use of electronic switches. In the present invention, however, the change-over of the beam diameter is carried out by shifting the band pass characteristic of the variable band pass filter 17 from the high to the low frequency band. That is, in the present invention, the ultrasonic beam diameter is changed over, by the FIG. 3-shown variation in the band pass characteristic, so that it may increase as in $BD_1$, $BD_2$, ..., $BD_n$ of FIG. 6 as the object portion deepens. Further, in the present invention, as the ultrasonic transducer elements go from the central N toward the furthermost-end ultrasonic transducer element 1 or $2N-1$, the imaging or extracting band is varied from the high to the low frequency band. In the ultrasonic beam, the high frequency component has a high resolution but, on the other hand, such high frequency component indicates large attenuation, so that the high frequency component from a deep interior zone of the living body fails to contribute to the image display. In contrast, the low frequency component indicates less attenuation, so that the low frequency component from a deep interior zone of the living body can sufficiently contribute to the image display. Accordingly, by varying, as in the invention, the beam diameter and extracting band in accordance with the depth of an object portion of the living body, the tomographic image having high resolution is obtained with regard substantially to any object portion of the living body over the non-deep to the deep interior zone of the living body. Note here that the tomographic image is displayed on a cathode ray tube of the display 19 when the filtered echo signal outputted from the variable band pass filter 17 is processed by the signal processing circuit 18 and then supplied to the display 19.

In the above-mentioned embodiment, the fixed band pass filters and variable band pass filter are employed. In the present invention, however, a band pass type amplifier may be employed instead. In this case, the band pass type amplifier can be designed to have the function to coordinate the difference in sensitivity of the ultrasonic transducer elements as well as the function to amend the propagation attenuation of the ultrasonic beam. The transducer elements may be arranged not only linearly but also in the curved form. Further, the fixed band pass amplifiers may be provided at the immediately preceding stage to the preamplifiers.

Next, the ultrasonic imaging apparatus according to another embodiment of the invention will be described with reference to FIG. 7. In this embodiment, the focal distance as well as the beam diameter is varied. From the pulser 12 drive pulses are generated with such time delays as to permit the ultrasonic beams to be focussed onto focal points $F_1, \ldots, F_{N-1}, F_N$. To explain by using as a reference the drive pulse $P_0$ supplied to the transducer element N, a drive pulse $P_1$ generated earlier than the drive pulse $P_0$ so as to permit the corresponding ultrasonic beam to be focussed onto the focal point $F_1$ is supplied to the transducer elements $N-1$ and $N+1$. Similarly, to the transducer elements 2 and $2N-2$ is supplied a drive pulse $P_{N-1}$ with such a timing as to permit the corresponding ultrasonic beam to be focussed onto the focal point $F_{N-1}$. When, in this way, the ultrasonic beams are focussed onto the focal points $F_1, \ldots, F_{N-1}, F_N$, the focal points $F_1$ to $F_N$ is formed on the axis of the central transducer element N. This focussing is called "signal focussing". When the ultrasonic beam is irradiated into the living body through the use of such "axial focussing", the echo waves enter the transducer elements 1 to $2N-1$ and are thereby converted into echo signals. These echo signals are respectively supplied to the band pass filters $14_1$ to $14_{2N-1}$ via the preamplifiers $13_1$ to $13_{2N-1}$. Thus, they are respectively filtered in accordance with their corresponding frequency bands. The filtered echo signals from the band pass filters $14_1$ to $14_{2N-1}$ are respectively supplied to the delay elements $15_1$ to $15_{N-1}$. These delay elements are respectively set with delay times for coordinating the mutual time differences between the drive pulses $P_0$ to $P_N$, into a desired one point of time. The echo signals, after passing through the delay elements $15_1$ to $15_{N-1}$, are added up or composed by the adder 16. The composite echo signal from the adder 16, when it is supplied to the variable band pass filter 17A, is filtered in accordance with the filtering characteristic, or such a varying filtering characteristic as shown in FIG. 8. That is, the variable band pass filter 17A has the filtering characteristic that the frequency band varies with the variation of its central frequency, and the above composite echo signal is filtered in accordance with the filtering characteristic $VBP_N, VBP_{N-1}, VBP_{N-2}, \ldots, VBP_1$ shown in FIG. 8. When the composite echo signal is filtered in accordance with the FIG. 8-indicated filtering characteristics, with regard to the filtering in accordance with the characteristic $VBP_N$ there is obtained an echo signal component corresponding to the central transducer element N. Further, with regard to the filtering in accordance with the characteristic $VBP_{N-1}$ there is obtained an echo signal component corresponding to the focal point $F_1$. In this case, the beam diameter of the ultrasonic transducer 11 is a coordinated beam diameter of the transducer elements $N, N-1$ and $N+1$. When the above composite echo signal is filtered in accordance with the characteristic $VBP_{N-1}$, the echo signal component is obtained which corresponds to the axial focussing of the focal points $F_1$ and $F_2$. At this time, the beam diameter of the ultrasonic transducer 11 is a coordinated beam diameter of the transducer elements $N, N-1, N+1, N-2$, and $N+2$. In this way, according to this embodiment, both the beam diameter, and the focal point can be varied.

In the above-mentioned two embodiments, the filtering characteristic of the variable band pass filter is continuously varied and the variable beam diameter and/or variable focal point is thus obtained without the use of any switching element. This means that no problem arise in regard to the switching noises. Further, since the beam diameter and/or focal point is continuously varied, the tomographic image obtained has continuity and thus becomes good for observation.

Figure 9:
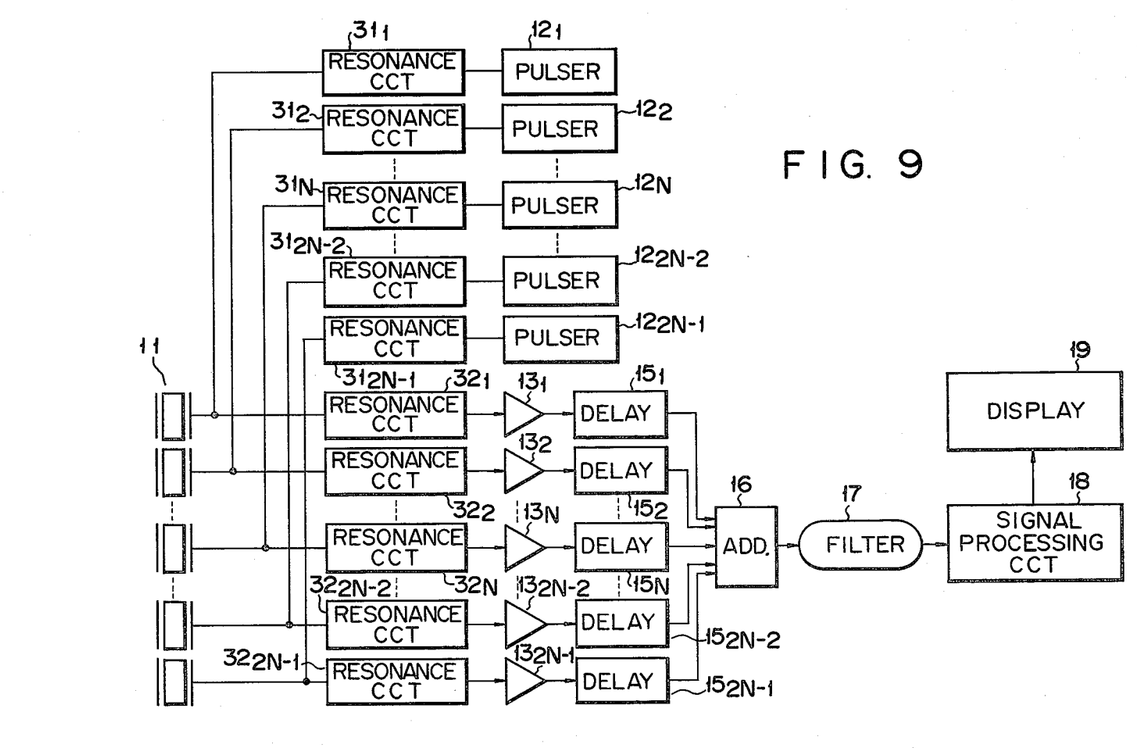
FIG. 9 is a schematic block circuit diagram of the ultrasonic imaging apparatus according to a further embodiment of the invention, in which resonance circuits are respectively connected to the ultrasonic transducer elements.
Figure 10:
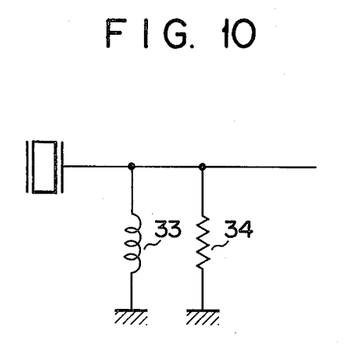
FIG. 10 is a view showing a parallel resonance circuit used in the third embodiment of FIG. 9.
Figure 11:
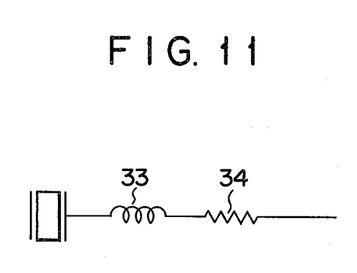
FIG. 11 is a view showing a serial resonance circuit used in the third embodiment of FIG. 9.

In the third embodiment of FIG. 9, drive resonance circuits $31_1$ to $31_{2N-1}$ and receiving resonance circuits $32_1$ to $32_{2N-1}$ are provided for the drive circuit including the pulsers $12_1$ to $12_{2N-1}$ and receiving circuit, respectively. The drive resonance circuits $31_1$ to $31_{2N-1}$, and receiving resonance circuits $32_1$ to $32_{2N-1}$, are respectively connected to the ultrasonic transducer elements 1 to $2N-1$. Each of the resonance circuits $31_1$ to $31_{2N-1}$ and $32_2$ to $32_{2N-1}$ is comprised of a parallel resonance circuit which, as shown in FIG. 10, is formed of an inductor 33 and a resistor 34 connected in parallel thereto. In each parallel resonance circuit, when the inductor 33 is set to a small inductance value, the central frequency becomes high. Further, when the resistor 34 is set to a large resistance value, the frequency band widens. Accordingly, by suitably setting the respective values of the inductor 33 and resistor 34, there are obtained resonance characteristics similar to the filtering characteristics of the fixed band pass filters $14_1$ to $14_{2N-1}$ shown in FIGS. 1 and 7. Thus, in this third embodiment, the same effect as attainable in the first and second embodiments of FIGS. 1 and 7 is obtained. Note here that the resonance circuit employed in this embodiment is not limited to the parallel resonance circuit but may be such a serial resonance circuit as shown in FIG. 11. Further, the resonance circuits may not have to be provided for each of the drive circuit and receiving circuit, but may be provided for either of them.

Figure 7:
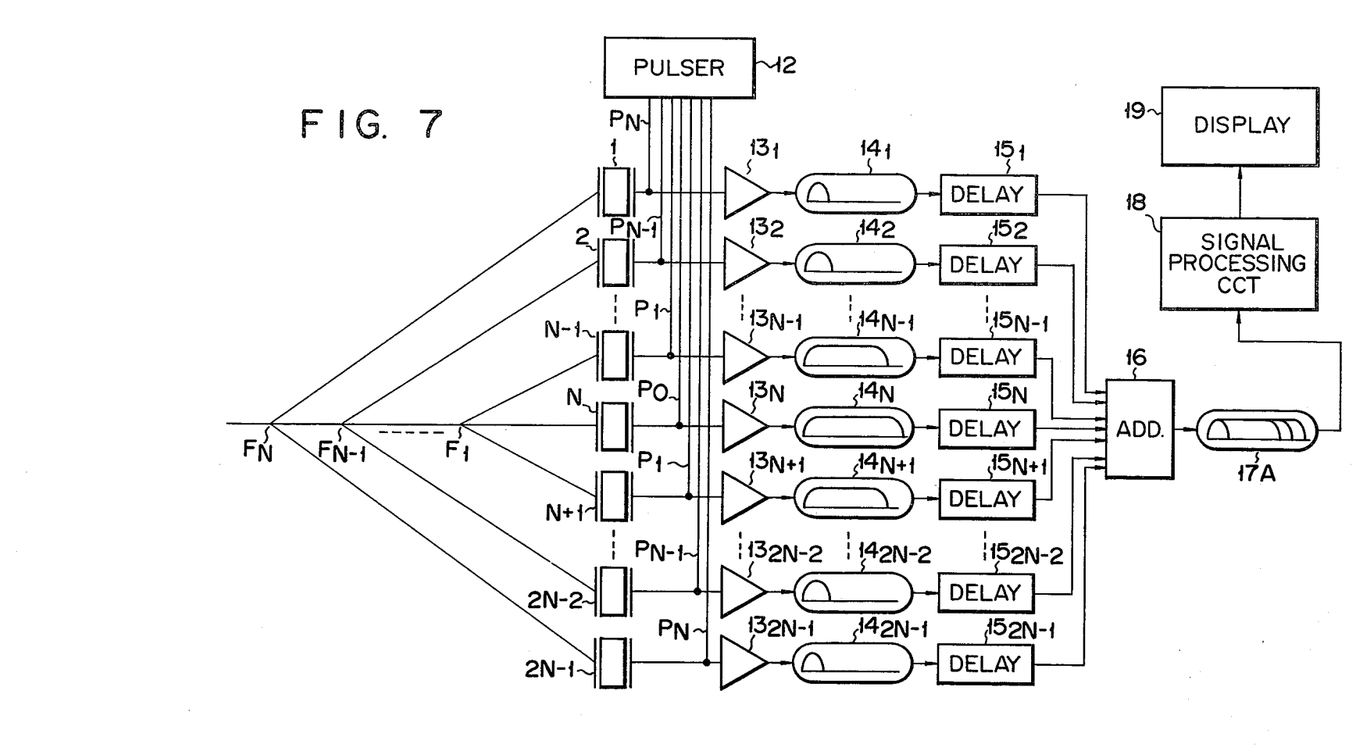
FIG. 7 is a schematic block circuit diagram of the ultrasonic imaging apparatus according to another embodiment of the invention.
Figure 8:
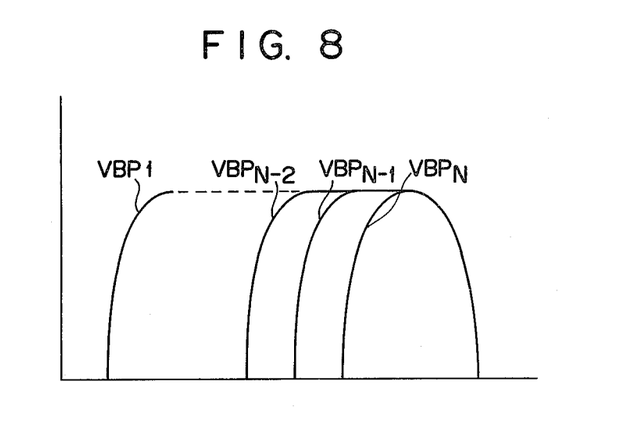
FIG. 8 is a view showing the frequency characteristic of the variable band pass filter shown in FIG. 7.

In the embodiments of FIGS. 1, 7 and 9, the band pass filters and resonance circuits are used. However, by modifying the ultrasonic transducer in regard to the element thickness the same effect as in using the band pass filters and resonance circuits is also obtained without using these filters and resonance circuits. That is, in the ultrasonic transducer, the piezoelectric element used therein has the nature that its frequency response depends upon its thickness while its central frequency is in inverse proportion to the thickness. Accordingly, by varying the thickness of the ultrasonic transducer elements 1 to 2N−1 as shown in FIGS. 12 and 13, the ultrasonic transducer 11 produces echo signals having similar characteristics to those in case of using the band pass filters.

Figure 12:
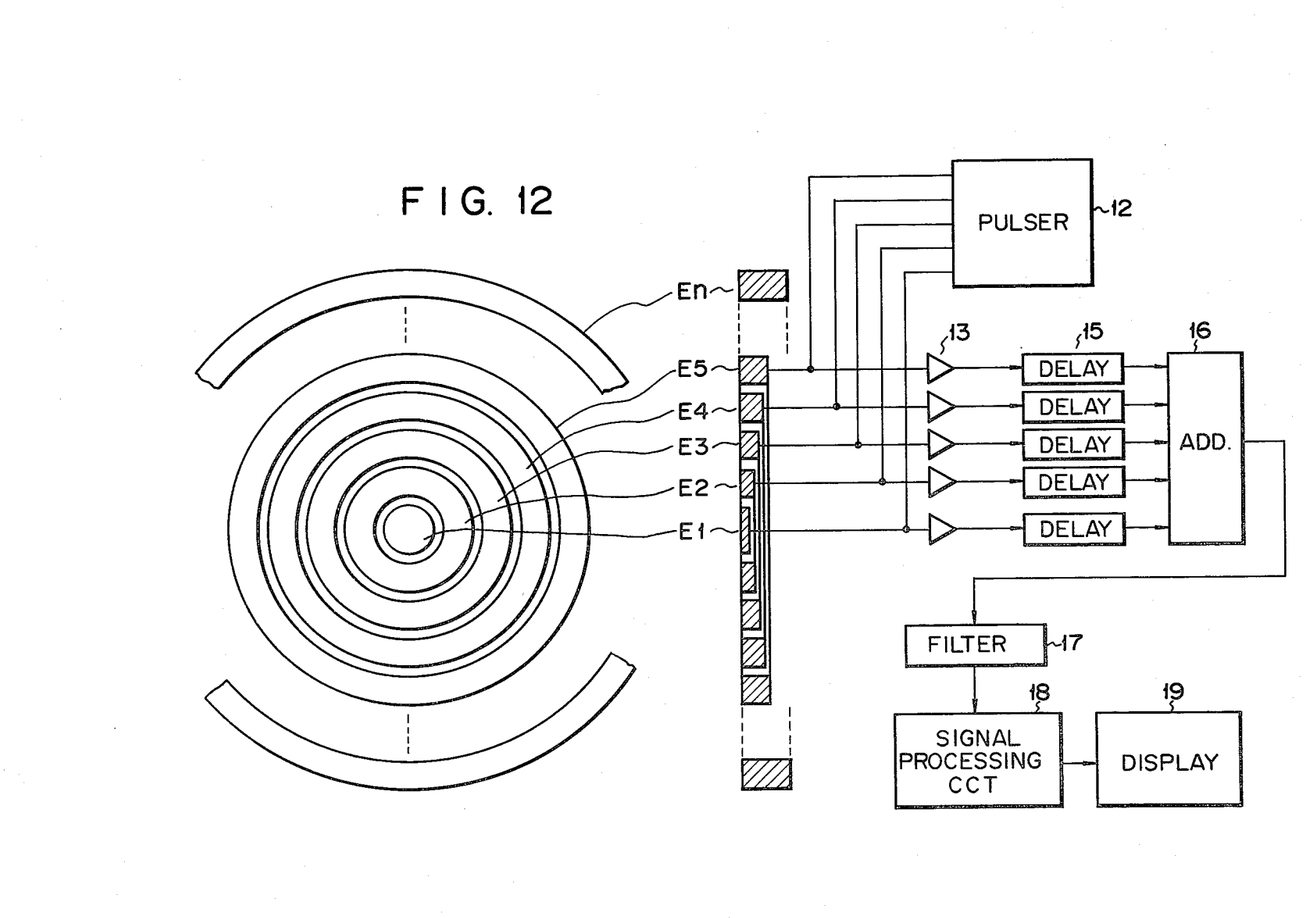
FIG. 12 is a view showing the ultrasonic imaging apparatus according to a yet further embodiment of the invention, which uses a concentric type ultrasonic transducer comprised of transducer elements different in thickness.

In the ultrasonic transducer shown in FIG. 12, annular piezoelectric elements $E_2$ to $E_n$, whose thicknesses become sequentially greater toward the outside, are concentrically disposed with a central piezoelectric element $E_1$ of the smallest thickness. These piezoelectric elements $E_1$ to $E_n$ are connected to the delay section 15 through the amplifier section 13. In this fourth embodiment, the central piezoelectric element $E_1$ transmits and receives a signal having the highest frequency while the outer piezoelectric elements $E_2$ to $E_n$ transmit and receive signals having sequentially lower frequencies. Accordingly, by selecting the echo signals from the piezoelectric elements $E_1$ to $E_n$ by the variable band pass filter 17, the beam diameter of the ultrasonic transducer 11 is varied from a small diameter to a larger.

Figure 13:
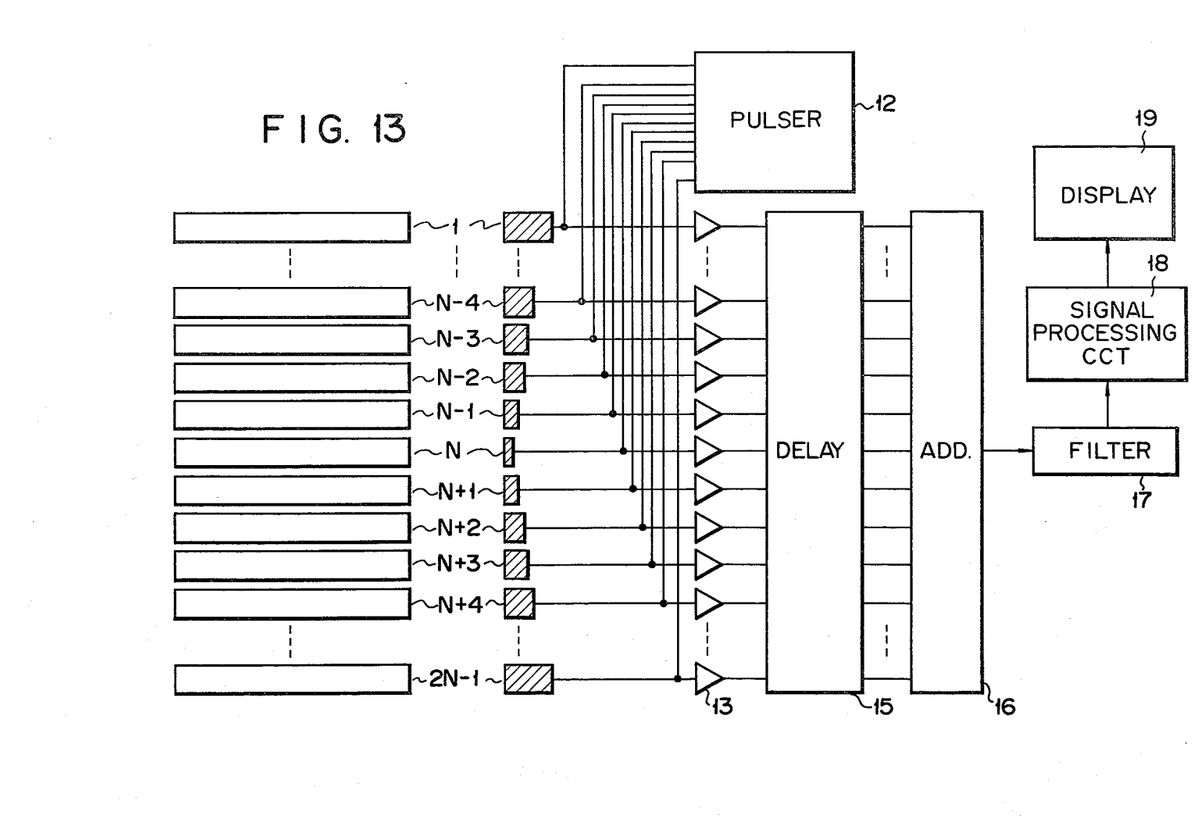
FIG. 13 is a view showing the ultrasonic imaging apparatus according to a yet further embodiment of the invention, which uses an ultrasonic transducer comprised of transducer strips different in thickness.

In the fifth embodiment of FIG. 13, the piezoelectric elements N−1 to 1 and N+1 to 2N−1 whose thicknesses become sequentially greater toward the ends are disposed on both sides of the central piezoelectric element N of the smallest thickness. These piezoelectric elements are connected to the variable band pass filter 17 through the amplifir section $13_1$ delay section 15 and adder 16 in that order. In this embodiment, the beam diameter of the ultrasonic transducer is also varied from a small diameter to a large as in the embodiment of FIG. 12.

Figure 14:
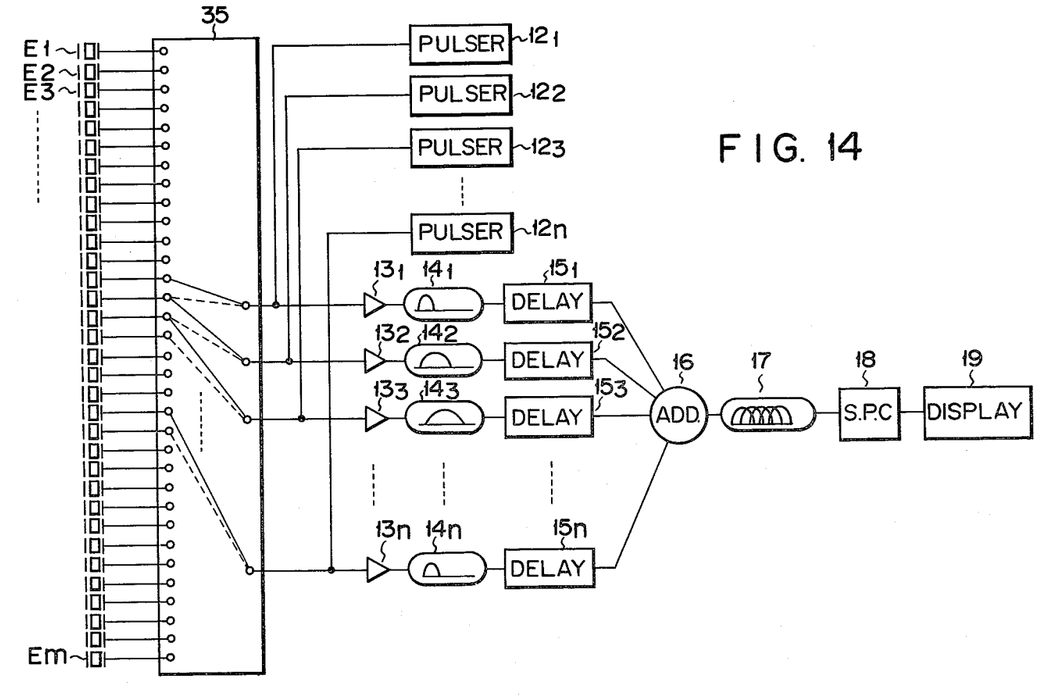
FIG. 14 is a circuit diagram showing the ultrasonic imaging apparatus of linear scan system according to a yet further embodiment of the invention.

All of the foregoing embodiments are based on the sector-scan system, but this invention is also applicable to the ultrasonic imaging apparatus of linear-scan system. FIG. 14 shows the ultrasonic imaging apparatus of linear-scan system according to the sixth embodiment of the invention. In this embodiment, the ultrasonic transducer elements $E_1$ to $E_m$ are respectively connected to m input terminals of an m-input/n-output switching circuit 35, the n output terminals of which are respectively connected to the band pass filters $14_1$, $14_2$, $14_3$, . . . , $14_n$ through the preamplifiers $13_1$ to $13_n$. The band pass filters $14_1$ to $14_n$, as shown in embodiments of the FIGS. 1, 7 and 9, are respectively set with the filtering characteristic so that they may have grandually narrower band widths and gradually lower central frequencies as they go toward the furthermost ends. In this embodiment, when the ultrasonic transducer elements $E_1$ to $E_m$ are sequentially changed over by the switching circuit one by one in units of n elements, the electron beams emitted from the n-number of ultrasonic transducer elements are focussed and linear-scan the object of the living body. Further, during the one-rate period, i.e., the transmitting and receiving period for one scanning line, the beam diameter of the ultrasonic transducer is substantially varied. Accordingly, such as ultrasonic imaging apparatus of linear-scan system as in this embodiment also has the same effect as that obtainable by the ultrasonic imaging apparatus of sector-scan system mentioned in the preceding embodiments. In this embodiment, the switching circuit 35 is employed, but, since the switching operation of this circuit 35 is carried out during the blank period at the time of shift from one transmitting & receiving operation to the next transmitting & receiving operation, the noises produced from the switching operation of the switching circuit 35 do not affect, for example, the echo signal at all.

As above described, according to the invention, as the transducer elements of the ultrasonic transducer go from the central toward the furthermost elements, the echo signals received by the transducer elements are respectively converted by the same into echo signal components having different central frequencies and different frequency bands, and then are composed into a composite echo signal. And since this composite echo signal is filtered by the variable band pass filter in accordance with its variable filtering characteristic and the beam diameter of the ultrasonic transducer is thus substantially varied, the imaging operation has no such undesirable effect of switching noises as may occur in regard to the ultrasonic imaging apparatus of variable beam-diameter system using the switching means. Thus, according to the invention, a precise ultrasonic tomographic image is obtained.

What is claimed is:

1. An ultrasonic imaging apparatus comprising:
   an ultrasonic transducer comprised of a plurality of ultrasonic transducer elements;
   drive means for supplying drive pulses to the transducer elements of the ultrasonic transducer to cause ultrasonic beams to be emitted from the transducer elements;
   prestage filtering means connected to the transducer elements to receive from the transducer elements echo signals corresponding to echo waves and filter the echo signals respectively in accordance with its different frequency characteristics;
   composing means for composing filtered echo signals from the prestage filtering means to obtain a composite echo signal;
   variable band pass filtering means connected to the composing means to filter the composite echo signal therefrom in accordance with its varying filtering characteristics, thereby to sequentially extract echo signal components corresponding to said different frequency characteristics;
   signal processing means connected to the variable band pass filtering means to convert the echo signal components therefrom into a tomographic signal; and
   display means connected to the signal processing means to display the tomographic signal therefrom as a tomographic image.

2. The ultrasonic imaging apparatus according to claim 1, wherein the prestage filtering means is comprised of a plurality of fixed band pass filters connected respectively to the transducer elements, said plurality of fixed band pass filters having different central frequencies and different frequency bands.

3. The ultrasonic imaging apparatus according to claim 2, wherein a central one of the fixed band pass filters corresponding to a central one of the ultrasonic transducer elements has the highest central frequency and widest frequency band; and the fixed band pass filters corresponding respectively to the side ultrasonic transducer elements have the central frequencies and frequency bands which become gradually lower and gradually narrower, respectively, as they go away from the central fixed band pass filter.

4. The ultrasonic imaging apparatus according to claim 1, wherein said variable band pass filtering means is comprised of a band pass filter which has a frequency band of fixed width and which central frequency is shiftable.

5. The ultrasonic imaging apparatus according to claim 1, wherein said variable band pass filtering means is comprised of a band pass filter which frequency band and central frequency are both variable.

6. The ultrasonic imaging apparatus according to any one of the preceding claims 1 to 5, wherein said variable band pass filtering means is comprised of a high pass filter which pass band is varied and a low pass filter which is connected to the high pass filter and which pass band is varied.

7. The ultrasonic imaging apparatus according to claim 1, wherein said prestage filtering means is comprised of resonance circuits connected respectively to the ultrasonic transducer elements and having different resonance characteristics.

8. The ultrasonic imaging apparatus according to claim 7, wherein each of said resonance circuits is comprised of a parallel resonance circuit.

9. The ultrasonic imaging apparatus according to claim 7, wherein each of said resonance circuits is comprised of a serial resonance circuit.

10. An ultrasonic imaging apparatus comprising:
an ultrasonic transducer comprised of a plurality of arranged ultrasonic transducer elements different in thickness;
drive means for supplying drive pulses to the ultrasonic transducer elements to cause ultrasonic beams to be emitted from the ultrasonic transducer elements;
receiving means for receiving from the ultrasonic transducer elements echo signals corresponding to echo waves;
composing means for composing the echo signals from the receiving means to produce a composite echo signal;
variable band pass filtering means connected to the composing means to filter the composite echo signal in accordance with its variable filtering characteristics, thereby to sequentially extract from the composite echo signal echo signal components corresponding to the echo signals from the ultrasonic transducer elements;
signal processing means connected to the variable band pass filtering means to convert filtered echo signals therefrom into a tomographic signal; and
display means connected to the signal processing means to display the tomographic signal as a tomographic image.

11. The ultrasonic imaging apparatus according to claim 10, wherein said ultrasonic transducer is comprised of a central ultrasonic transducer element of the smallest thickness and a plurality of annular ultrasonic transducer elements sequentially disposed concentrically with the central ultrasonic transducer element, said annular ultrasonic transducer elements being gradually larger in thickness as they go away from the central ultrasonic transducer element.

12. The ultrasonic imaging apparatus according to claim 10, wherein said ultrasonic transducer is comprised of a central ultrasonic transducer strip and a plurality of side ultrasonic transducer strips sequentially disposed on both sides of the central ultrasonic transducer strip, said side ultrasonic transducer strips being gradually larger in thickness as they go away from the central ultrasonic transducer strip.

13. An ultrasonic imaging apparatus comprising:
an ultrasonic transducer comprised of m number of ultrasonic transducer elements;
m-input/n-output switching means connected to the ultrasonic transducer to sequentially change over the ultrasonic transducer elements at least one by one in units of n number of elements (n<m);
drive means for supplying drive pulses to n number of ultrasonic transducer elements through the switching means to cause ultrasonic beams to be emitted from the n number of ultrasonic transducer elements;
receiving means for receiving the echo signals corresponding to echo waves through the switching means;
prestage filtering means for filtering the echo signals from the receiving means, respectively, in accordance with its different frequency characteristics;
composing means connected to the prestage filtering means to compose filtered echo signals from the prestage filtering means to produce a composite echo signal;
variable band pass filtering means connected to the composing means to filter the composite echo signal in accordance with its variable filtering characteristics thereby to sequentially extract echo signal components corresponding to said different frequency characteristics;
signal processing means connected to the variable band pass filtering means to convert the echo signal components into a tomographic signal; and
display means connected to the signal processing means to display the tomographic signal as a tomographic image.

* * * * *